Fig. 1

L. F. HART.
DEVICE FOR CUTTING SCREW THREADS.
APPLICATION FILED MAR. 23, 1906.

1,017,148.

Patented Feb. 13, 1912.

Witnesses:
Edw. Lindmueller.
Jno. F. Oberlin

Inventor:
Louis F. Hart
By J. P. Fay
His Attorney.

UNITED STATES PATENT OFFICE.

LOUIS F. HART, OF CLEVELAND, OHIO, ASSIGNOR TO THE HART MANUFACTURING COMPANY, OF CLEVELAND, OHIO, A CORPORATION OF OHIO.

DEVICE FOR CUTTING SCREW-THREADS.

1,017,148.  Specification of Letters Patent.  Patented Feb. 13, 1912.

Application filed March 23, 1906. Serial No. 307,598.

*To all whom it may concern:*

Be it known that I, LOUIS F. HART, a citizen of the United States, resident of Cleveland, county of Cuyahoga, and State of Ohio, have invented a new and useful Improvement in Devices for Cutting Screw-Threads, of which the following is a specification, the principle of the invention being herein explained and the best mode in which I have contemplated applying that principle, so as to distinguish it from other inventions.

My invention relates to devices for cutting screw-threads on pipes, rods and the like. It is particularly designed for use on the first-named article, the thread on which is preferably made with a taper in order to insure a tight-fitting joint. The first object of my invention, then, is to provide means for automatically producing such a tapered thread; other and equally important objects are the provision of means for quickly adjusting the device to fit work of different dimensions and to automatically release such work when a thread of the standard length has been cut, whereby the device can be removed without the necessity of reversing; as also the provision of means whereby the dies may be started without either the aid of forward pressure by the hand or the use of a leader screw, thus saving extra exertion on the part of the operator, and obviating the necessity, at present existing, of having to turn the die-holding member back from time to time to a fit position for again starting. By doing away with the use of such leader screw I am further enabled to employ my device for the cutting of threads of various pitches, and either right or left-handed, as desired, without having to make other than slight, and readily effected, changes in the parts of the device.

To the accomplishment of the above and related objects my invention consists of means hereinafter fully described and particularly set forth in the claims.

The annexed drawings and the following description set forth in detail certain mechanism embodying the invention, such disclosed means constituting but one of various mechanical forms in which the principle of the invention may be used.

In said annexed drawings: Fig. 4 a rear elevation of a portion thereof; while

As has been indicated, the specific form of device chosen as best illustrating the several improvements embodied in my invention is a pipe-threading tool or machine. The general form of such tool or machine, as it may be variously designated depending upon the size of work it is designed to accommodate and upon whether it is operated manually or by power, is clearly shown in Fig. 1. From an inspection of this figure, and of the cross-section appearing in Fig. 2, the tool will be seen to be made up of two main elements, a stock-holding frame member A, and a die-holding member B revolubly mounted in said frame member. Frame member A, although integral in actual construction, may be regarded as being made up of three concentric but axially separated annular portions $a'$, $a^2$, and $a^3$, joined together by a plurality of connecting portions $a$.

Annular portion $a'$ of the frame is designed to serve as the work-holding device. To this end it is provided with a removable guide-sleeve A' and with a plurality of radially disposed set screws $a^4$ that are equidistantly mounted therein about its periphery and project through apertures $a^5$ in guide-sleeve A' to engage with the pipe P or other work on which the screw-threads are to be cut.

To adapt the work-holding device to receive any particular size of pipe it is only necessary to fit in annular portion $a'$ a guide-sleeve A' of the proper diameter. In the type of screw-threading tool illustrated, it is of course intended that the pipe should be held against rotation in a suitable vise or the like, the purpose of the work-holding mechanism just described then being merely to hold the tool-frame from rotation on the pipe. Use of a vise, however, for holding the pipe may be dispensed with by providing frame A with a foot or base whereby it can be attached to a work-bench or the floor. In this form, set screws $a^4$ and guide sleeve A′ would preferably be replaced by an adjustable screw vise as rendering the machine more quickly adjustable to receive different sizes of pipe.

Figure 1:
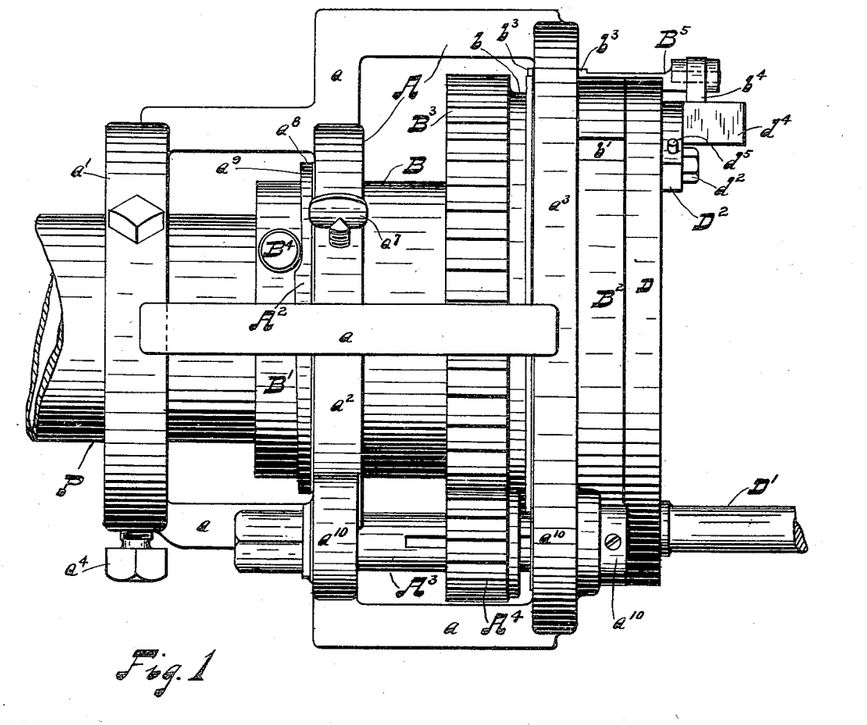
Figure 1 represents a side elevation of my improved screw-cutting device as adapted for the threading of pipes, a section of a pipe being shown in position to be operated upon.
Figure 2:
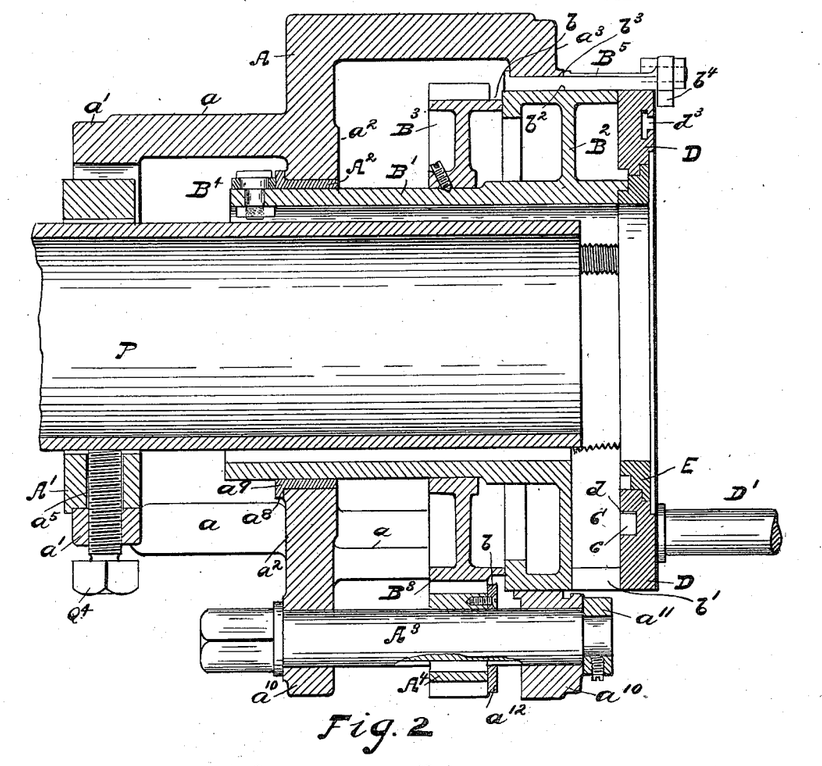
Fig. 2 is a central vertical longitudinal cross-section of the device as illustrated in Fig. 1.

Annular portion $a^3$ of the frame A is of larger diameter than portion $a^2$, and the inner faces of both portions form bearings for the die-holding member B. Such bearing is formed directly by the face of the annular portion $a^3$; in the case of portion $a^2$, however, a bushing $A^2$, Figs. 1 and 2, is introduced. This bushing is removably secured in place by means of a thumb-screw $a^7$ mounted in portion $a^2$ of the frame and projecting inwardly through the same far enough to engage the bushing. Such bushing is provided with an integral collar $a^8$ designed to fit against frame portion $a^2$, and furthermore has its rear edge formed to present a cam-surface $a^9$ as shown in Fig. 1, this surface being of a single continuous pitch and the same as that on the dies in use at the time. The function of this bushing, as will presently appear, is to assist in starting the dies at the beginning of the thread-cutting operation, and I shall accordingly hereafter refer to it as the leader bushing.

On one side of frame A, and preferably intermediately of two connecting portions $a$, are provided bearings $a^{10}$ in which is journaled a short shaft $A^3$, held in place therein by a collar $a^{11}$ secured to its one end and shaped square at the other end to receive a ratchet wrench, not shown, whereby it may be rotated. In a larger power-driven machine the power would, of course, be applied here through suitable driving means. Splined on such shaft $A^3$ intermediately of its bearings is a small pinion $A^4$ that serves to communicate motion to die-holding member B.

Figure 6:
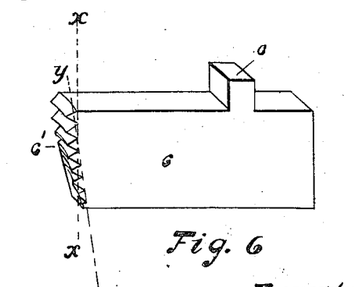

Die-holding member B consists primarily of a sleeve portion B′ fitting at one end within leader bushing $A^2$, and provided near the other end with a rim-bearing flange $B^2$ fitting within annular frame portion $a^3$. The bearing surfaces of both the sleeve and flange portions of member B are sufficiently broad to permit to said member, in addition to its rotary movement, a longitudinal movement equal to or greater than the maximum length of thread that the device is intended to cut. On sleeve portion B′ of member B and just to the rear of flange $B^2$ is secured a gear $B^3$ adapted to mesh with pinion $A^4$ on shaft $A^3$ whereby rotary motion may be communicated to said member. An encircling notch $b$ is formed between the rim of flange $B^2$ and this gear $B^3$ and pinion $A^4$ has attached to its outer face a collar $a^{12}$ that registers in such groove. By this means the pinion is moved along shaft $A^3$ as the gear is shifted longitudinally with member B within frame A, and the two are kept constantly in mesh. In its face member B is provided with a plurality of radial slots or recesses $b'$, Figs. 2 and 3, that are designed to receive and slidably hold the dies or chasers C, Figs. 2 and 6. The number of such slots and corresponding dies may, of course, be varied as desired, there being four in the form of the device illustrated. The dies are normally retained in their respective slots by means of an annular plate D, revolubly secured to the face of member B by means of a shoulder ring E, that is attached to such member by suitable screws $e$. Annular plate D bears on its inner face a series of cam-grooves $d$, Fig. 3, where, however, only one is shown in order to avoid confusion. Such grooves correspond in number and disposition with dies C, which are formed with integral projections $c$ preferably of the shape shown in Fig. 6 and adapted to register in the grooves. Pins may be employed instead of projections $c$ but would not be quite so strong. The length and conformation of the cam groove $d$ may, of course, be varied to give any desired range of throw or radial adjustability to the dies. Thus, they might have to be spiral in order to position the same dies for use on more than two or three different standard diameters of pipe. It is not ordinarily considered practical, however, to use the same dies on more than the above-indicated number of sizes of stock since the variation in curvature would be too great to permit the dies to cut efficiently on all, for the cutting-face of a die-block is not only threaded to a particular pitch but is also made transversely concave to conform with a particular curvature of stock. Rotation of the cam-plate, as I shall term annular plate D, accordingly serves to either advance or retract dies C in slots $b'$ as may be desired, and in one position permits their release from such slots entirely. Such rotation of the cam-plate is facilitated by the provision of a handle D′ on its outer face, Figs. 1 and 2.

Figure 3:
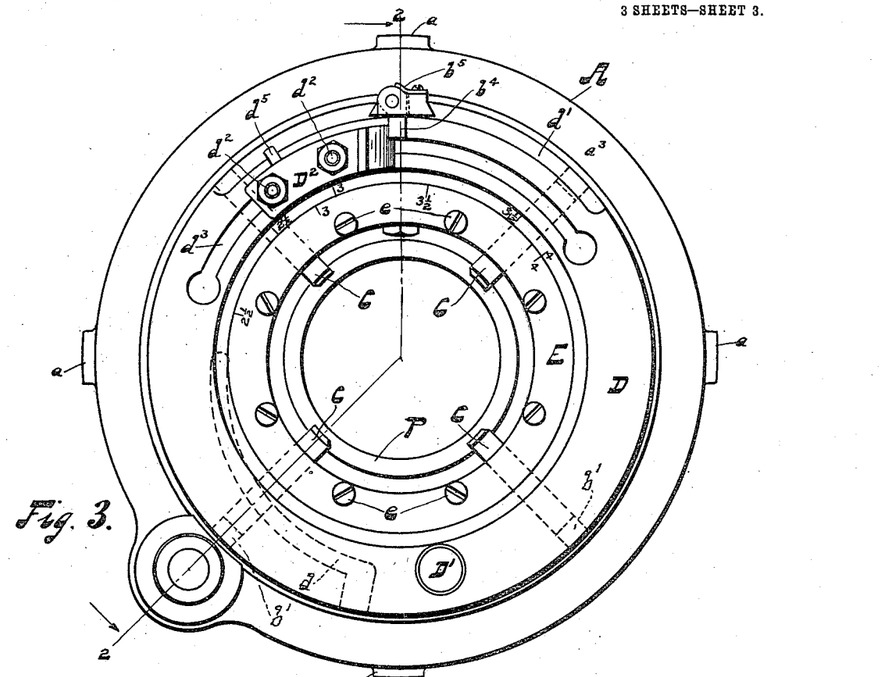
Fig. 3 is a front elevation of such device.
Figure 4:
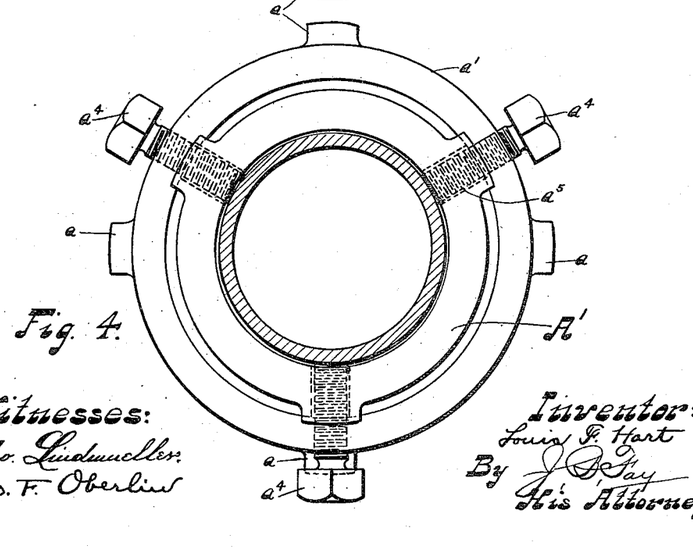
Figure 5:
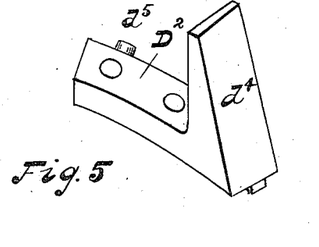
Figs. 5 and 6 are perspective views on a larger scale of a structural detail, and of a die-block used in the device, respectively.

At a convenient point in the periphery of the rim-bearing flange $B^2$ of die-holding member B is formed a recessed longitudinal slot $b^2$ and slidably mounted therein is a rider-bar or post $B^5$, Fig. 2. Such rider-bar lies substantially flush with the bearing surface of flange $B^2$ so as to not interfere with the rotation of the latter, and bears near its inner end two outwardly projecting transverse ribs or flanges $b^3$ disposed to engage opposite sides of annular portion $a^8$ of the frame A. Such rider-bar, although freely rotatable with die-holding member B as has been indicated, is by this means prevented from moving longitudinally along with such member. The outer end of rider-bar $B^5$, in the normal position of the parts as shown in the several figures, projects a trifle beyond the front face of cam-plate D, and an elongated recess $d'$, Fig. 3, is cut in the periphery of the latter so as to allow it the rotary movement required in adjusting the position of the dies. In a notch in such outer end of the rider-bar is pivoted, on an axis longitudinal with the bar, a rider-dog $b^4$ adapted to swing freely in one direction, from the normal position in which it is shown in Fig. 3, but locked by contact with the bar against such movement in the other direction. A leaf-spring $b^5$ mounted upon the outer end of rider-bar $B^5$ and frictionally engaging such dog serves to prevent it from being swung out of its normal position when not desired. The object of dog $b^4$ is to hold cam-plate D from rotation when once the dies have been properly positioned, such dog constituting the operative portion of the post or rider-bar as will be readily understood. To this end such cam-plate is provided on its face with a recessed or T-slot $d^3$ of circular conformation, adapted to receive bolts $d^2$ which serve in turn to secure a segmental plate $D^2$, Figs. 3 and 5, in any desired axial position on the cam-plate, the segmental plate $D^2$ which is thus detachably and adjustably secured thereto, constituting a stop for the dog $b^4$ as will now be explained. In adjusting the dies cam-plate D is first revolved to properly position the same, and stop $D^2$ thereupon moved along slot $d^3$ into contact with dog $b^4$. During the thread-cutting operation the pressure of the dies against the grooves $d$ of the cam-plate suffices to maintain such contact of stop $D^2$ and dog $b^4$. The contacting-face, Fig. 5, of stop $D^2$ is formed by an outwardly projecting stud $d^4$ at one end thereof, and is beveled as shown, to incline in the same direction as that in which the cam grooves recede from the center. This bevel surface may hence be styled right helicoidal, Figs. 3 and 5, being in effect shaped so as to present to the face of the dog $b^4$ a surface every element of which in planes at right angles to the direction of the dog's travel with respect to such stop, is radial with the axis of the device. Thus, where the degree of bevel, or twist, is properly calculated for the rate of revolution desired of the cam-plate, uniformity of such movement is secured and at the same time a full bearing for the dog at all times afforded. It will therefore be evident that cam-plate D is not absolutely fixed by dog $b^4$ but that a limited rotative movement is permitted as die-holding member B moves longitudinally inward relatively to frame A; for, as a consequence of such relative longitudinal movement of member B, rider-bar $B^5$ is caused to project farther and farther beyond the face of the cam-plate D and so dog $b^4$ moves outwardly along the contacting-face of stop $D^2$; such contacting-face being beveled as has been stated and the pressure of the dies tending to hold the same against the dog, a gradual, although limited, rotation of the cam-plate occurs. This rotative movement of the cam-plate permits a corresponding outward radial movement or retraction of the dies C, and as soon as the continued inward movement of member B causes dog $b^4$ to project entirely beyond stop $D^2$, the cam-plate is no longer held, and the dies free themselves entirely from the work. Rotation of cam-plate D, however, to a position where such dies would be released from their slots, is prevented by the engagement with rider-bar $B^5$ of a secondary stop pin $d^5$, Fig. 3, mounted on the outer side of stop $D^2$.

In connection with the foregoing description of the means employed to effect a limited rotative movement of cam-plate D, attention should be called to the fact that it is obviously immaterial whether the bevel be on the face of stop $D^2$ or on the contacting-face of rider-bar $B^5$. Other means might suggest themselves to a skilled mechanic whereby the rotation of such cam-plate could be made to occur simultaneously with the longitudinal movement of member B with reference to frame A; the means shown, while of a preferred form, are at the same time merely typical.

As has been, no doubt, observed, I employ no leader screw to feed the die-holding member B forward upon the work, the dies being allowed to feed themselves. This they are readily enabled to do by virtue of their peculiar design, which consists in providing them with a thread having an increased taper $c'$ in the throat, see Fig. 6. As there shown, the main or cutting threads are cut on one taper, indicated by the construction line $x—x$, whereas the starting threads are cut on a more abrupt taper indicated by the line $y—y$. The term "taper", it should be explained is not necessarily limited to a taper on a straight line such as is shown, but as is well understood may be a portion of any suitable curve as well as a straight line. Such starting threads are furthermore beveled in the usual fashion to form the throat $c'$ of the die. They are thus not only self-centering but self-gripping. To assist them, however, in securing an initial grip, I provide the leader bushing $A^2$ already described as having a cam-edge on its rear side. This cam-edge is disposed to coöperate with a roller $B^4$, Fig. 2, mounted on the rear end of sleeve portion $B'$ of the die-holding member so as to move such member forward during its first turn a distance equal to the pitch of the thread being cut. The feeding for the remaining turns is left entirely to the dies. By reason of the automatic expansion permitted the dies as they advance in order that the necessary taper may be given the thread, I am enabled further to shorten the cutting edges of my dies and thus greatly decrease the force required for their working. In other words, instead of making the dies with cutting faces as long as, or longer than the threads they are to cut, I can make them with faces shorter than such threads. The heavy draft incident to the employment of dies with long faces, where, in finishing a thread, the dies are cutting for a distance along the edges that is as great as the length of the thread being cut, and where the sizing of the thread on the end is therefore being done by that portion of the cutting edges that was last screwed on, is much reduced. Inasmuch, however, as the shorter faced die at the start must take a much heavier cut than a die of the above described ordinary form, all of the metal at the end of the pipe having to be removed while such short face, or edge, is passing over the end, the resistance becomes so great that, in the absence of some device like a leader screw to pull them on for at least several turns, the die requires to be made with a leading thread in its throat, cut on a more abrupt taper than the main thread which preferably has a taper the same as that of the thread to be cut on the pipe. Now this more abruptly tapered starting thread in the throat has never heretofore, as far as I am aware, been employed for cutting tapered threads with tools having dies shorter than the thread to be cut and so requiring to be expanded as the tool advances on the work, a leader screw, or equivalent means, being employed instead. In fact it has been deemed impossible to so employ dies with the more abruptly tapered starting thread for the reason that the thread produced thereby is very apt to be broken and imperfect; especially in the case of soft wrought iron, of which pipes are largely fashioned, the strain on the material as it meets the cutting edge in the grooves of the thread on the more abruptly tapered portion of the die and is forced therein, is more than such material can resist. This difficulty which is present to quite a noticeable extent even in the work of the long faced die, becomes much aggravated in the case of the die under consideration by reason of the much deeper cut that this same starting thread is obliged to take at the start. The automatic expansion of the dies, however, above referred to, I have adapted so as to relieve this starting thread from cutting once it has served its proper function of initially gripping the stock and to throw the burden of the cutting operation upon the main thread of the die. Practically the whole portion of the actual cutting is hence performed by this main thread, particularly by the first of such main thread, the rearmost simply leading the die on by following in the grooves already cut although they also serve to clean out the latter and give the thread a finished appearance.

Having thus described the several parts of my device, and in an incidental way their particular functions, I shall now proceed to set forth their general operation.

While a machine or tool might be constructed on the plans of the model just described that would have a wider range of adjustability in the matter of the size of stock with which it could be used, for practical reasons one that can be used on three or four stock-sizes would generally be preferable. Thus the one figured in the drawings is designed to be used with $2\frac{1}{2}$, 3, $3\frac{1}{2}$, and 4-inch pipe, and suitable graduations are provided on the faces of shoulder-ring E and cam-plate D to assist in adjusting the dies for these standard sizes. Obviously any intermediate odd size may be cut just as easily. Assuming then that a thread of a given pitch is to be cut on a section of 4-inch pipe, the pipe in question would first be gripped in a vise. To adjust the thread-cutting tool, dies of the pitch desired are fitted in slots $b$, and a leader bushing $A^2$ of pitch to correspond with such dies is fitted in annular portion $a^2$ of the frame. A guide-sleeve $A'$ of the proper diameter is next fitted in the frame of such tool and die-holding member B thereupon rotated to position roller $B^4$ at the beginning of the cam on the leader-bushing $A^2$. Then cam-plate D is rotated to bring the graduation 4 thereon into alinement with the corresponding graduation on shoulder-ring E, and stop $D^2$ is moved up against rider-dog $b^4$ and bolts $d^2$ drawn tight. The tool is then secured in place on the end of the pipe, such pipe-end resting on the inner tapered edge of the dies, and the actual operation begun by rotating shaft $A^3$ and thereby die-holding member B. The leader bushing $A^2$ assists the dies in firmly gripping the stock during the first rotation of such member; upon further rotation of the latter the dies automatically advance on the stock. Coincidently a limited rotative movement of cam-ring D occurs by virtue of the construction of rider-bar $B^5$ and stop $D^2$, whereby the dies are permitted to gradually retreat and so cut a tapered thread. When the standard length of thread has been cut the stop $D^2$ escapes from rider-dog $b^4$ and cam-plate D will rotate far enough to relieve the outward pressure on the dies and they stop cutting. A slight additional turn forward should be given member B in order to clean out the threads and remove the bur from them. To withdraw the tool, cam-plate D is then rotated until secondary stop-pin $d^5$ contacts with rider-bar $B^5$. Such movement permits the dies to retreat entirely free of the stock, and upon releasing the stock-holding device, the tool can be forthwith removed. If, now, it is desired to repeat the operation on the same size of stock, all that is necessary to prepare the tool, is to return member B and cam-plate D to their initial positions. If it is desired to cut a thread of the same pitch but on 3½-inch instead of 4-inch stock, aside from exchanging guide-sleeve A' for another of smaller diameter, it is merely necessary to adjust cam-plate D and stop D² to their new positions. To use the tool on a still smaller diameter of stock, as 2½-inch, it will be necessary to employ a longer die, providing the cam-plate is of the type illustrated, since the throw of cam-grooves $d$ is not great enough to cover the entire range with one size of die. Anyhow, as has been explained, it is not desirable to use the same die on more than two successive standard sizes of stock. If, on the other hand, a thread of different pitch is required, new dies will require to be inserted and the leader bushing exchanged for one of corresponding pitch. For cutting left-hand threads, no additional changes need be made in the tool except to employ a corresponding set of dies and leader bushings. It is accordingly seen that my improved thread-cutting device automatically cuts a thread of standard length and of desired taper, and that, immediately upon the thread being finished, it releases the dies. By the use of a die of the peculiar design described, the need for a leader screw is obviated and the same machine is rendered available for cutting threads of any pitch and either right or left-handed. It is hence seen that along with a simplification of structure, I attain in my device an increased adjustability and a wider range of use.

In the form of machine chosen for the purpose of illustrating my invention, the stock-holding means are represented as being fixed and the die-holding member movably mounted therein. Obviously this may be reversed, i. e. the die-holding member may be held stationary and the stock-holding means rotated without affecting the operation of the taper-producing mechanism. In fact in a lathe or similar machine the device would of necessity have to be thus modified.

Having thus described my invention in detail, that which I particularly point out and distinctly claim, is:—

1. The combination of work-holding means; a die-holding member, said means and member being longitudinally and rotatably movable with reference to each other; dies movable in said member; a plate rotatably secured to said member, said plate engaging said dies and being adapted upon rotation to position the same in said member, the die-engaging elements of said plate being so arranged and constructed that the outward pressure of the dies is effective to rotate said plate in a predetermined direction; and means adapted to control the rotation thus had, the operation of said means being effective upon the longitudinal movement of said member.

2. The combination of work-holding means; a member longitudinally and rotatably movable with reference thereto; dies movable in said member; a plate rotatably secured to said member and provided with cam-elements engaging said dies, the elements of said cam-plate being so disposed that the outward pressure of said dies is effective to rotate the latter in a predetermined direction; and an element supported so as to be rotatably movable but longitudinally fixed relatively to said work-holding means, said element being connected with said member so as to rotate therewith, and engaging with said cam-plate to control the rotation effected by said dies.

3. The combination of work-holding means; a member longitudinally and rotatably movable with reference thereto; dies movable in said member; a plate rotatably secured to said member, said plate engaging said dies and being adapted upon rotation to position the same in said member, the die-engaging elements of said plate being so arranged that the outward pressure of said dies is effective to rotate said plate in a predetermined direction; and an element borne by said member, so as to be rotatable therewith, but longitudinally fixed relatively to said work-holding means, said element engaging with said plate and the engaging faces of said element and plate being arranged and constructed to permit the latter a limited rotative movement upon longitudinal movement of said member with respect to said work-holding means.

4. The combination of work-holding means; a die-holding member, said means and member being longitudinally and rotatably movable with reference to each other; dies movable in said member; and inter-engaging elements borne by said work-holding means and member, respectively, and adapted to restrain retraction of said dies, the faces of said elements being proportioned to the length of the thread to be cut, whereby said elements are disengaged upon proper longitudinal movement of said member with respect to said work-holding means and said dies thus left free to retract.

5. The combination of work-holding means; a member longitudinally and rotatably movable with reference thereto; dies movable in said member; inter-engaging elements borne by said work-holding means and member, respectively, and adapted to restrain retraction of said dies, the faces of said elements being proportioned to the length of the thread to be cut, whereby said elements are disengaged upon proper longitudinal movement of said member with respect to said work-holding means and said dies thus left free to retract; and other means, independent of said elements, adapted to limit such retraction.

6. The combination of work-holding means; a member longitudinally and rotatably movable with reference thereto; dies movable in said member; a plate rotatably secured to said member, said plate engaging said dies and being adapted upon rotation to position the same in said member; and an element borne by said member so as to be rotatable therewith, but longitudinally fixed relatively to said work-holding means, said element engaging with said plate to control the rotation thereof, and the engaging faces of said element and plate being proportioned to the length of the thread to be cut, whereby said plate is disengaged from said element upon proper longitudinal movement of said member with respect to said work-holding means and thus left free to rotate.

7. The combination of work-holding means; a member longitudinally and rotatably movable with reference thereto; dies movable in said member; a plate rotatably secured to said member, said plate engaging said dies and being adapted upon rotation to position the same in said member, the die-engaging elements of said plate being so arranged and constructed that the outward pressure of said dies is effective to rotate said plate in a predetermined direction; and an element borne by said member, so as to be rotatable therewith, but longitudinally fixed relatively to said work-holding means, said element engaging with said plate and the length of the engaging faces of said element and plate being proportioned to the length of thread to be cut, whereby said plate is disengaged from said element upon proper longitudinal movement of said member with respect to said work-holding means and thus left free to rotate.

8. The combination of work-holding means; a member longitudinally and rotatably movable therein; dies movable in said member; a plate rotatably secured to said member and provided with cam-grooves engaging said dies, the grooves of said cam-plate being so disposed that the outward pressure of said dies is effective to rotate the latter in a predetermined direction relatively to said member; and engaging elements borne by said cam-plate and member, respectively, said elements being arranged and constructed to permit, upon relative movement therebetween, limited rotative movement of said cam-plate, and said work-holding means being connected with one of said elements, whereby such relative movement is had upon longitudinal movement of said member in said work-holding means.

9. The combination of work-holding means; a member longitudinally and rotatably movable therein; dies movable in said member, a plate rotatably secured to said member and provided with cam-grooves engaging said dies, the grooves of said cam-plate being so disposed that the outward pressure of said dies is effective to rotate the latter in a predetermined direction relatively to said member; and engaging elements borne by said cam-plate and member, respectively, the length of the engaging faces of said elements being proportioned to the length of thread to be cut, and said work-holding means being connected with the element borne by said member, whereby such member is disengaged from the other element upon a predetermined longitudinal movement of said member in said work-holding means and said cam-plate thus left free to rotate.

10. The combination of work-holding means; a member longitudinally and rotatably movable therein; dies movable in said member; a plate rotatably secured to said member and provided with cam-grooves engaging said dies, the grooves of said cam-plate being so disposed that the outward pressure of said dies is effective to rotate the latter in a predetermined direction relatively to said member; and engaging elements borne by said cam-plate and member, respectively, said elements being arranged and constructed to permit, upon relative movement therebetween, a limited rotative movement of said cam-plate, the length of the engaging faces of said elements being proportioned to the length of the thread to be cut, and said work-holding means being connected with the element borne by said member, whereby such relative movement between said elements is had upon longitudinal movement of said member and said elements thereupon disengaged and said cam-plate left free to rotate.

11. In a screw-cutting device, the combination of a frame; a member longitudinally and rotatably movable in said frame; dies movable in said member; a slide-bar longitudinally movable therein and held against longitudinal movement with respect to said frame; a cam-plate rotatably secured to said member and engaging said dies; and a stop secured to said cam-plate and adapted to engage said bar, the outward pressure of the dies being effective to rotate said cam-plate to hold said stop against said bar, and the engaging faces of said bar and stop being formed to permit said cam-plate a limited rotative movement relatively to said member upon longitudinal movement of the latter in said frame.

12. In a screw-cutting device, the combination of a frame; a member longitudinally and rotatably movable in said frame; dies movable in said member; a slide-bar longitudinally movable therein and held against longitudinal movement with respect to said frame; a plate rotatably secured to said member and provided with cam-grooves engaging said dies; and a stop secured to said cam-plate and adapted to engage said bar, the grooves of said cam-plate being so disposed that the outward pressure of said dies is effective to rotate the same to hold said stop against said bar, the engaging faces of said bar and stop being formed to permit said cam-plate a limited rotative movement relatively to said member upon longitudinal movement of said member in said frame, and the length of said stop being proportioned to the length of thread to be cut whereby said stop and bar are disengaged upon a predetermined amount of such longitudinal movement.

13. In a screw-cutting device, the combination of a frame; a member longitudinally and rotatably movable in said frame; dies movable in said member; a slide-bar longitudinally movable therein and held against longitudinal movement in said frame; a cam-plate rotatably secured to said member and engaging said dies, the outward pressure of the latter being effective to rotate said cam-plate; and a stop secured to said cam-plate so as to be adjustable upon an arc having the axis of the device as its center and adapted to engage said bar, said stop having an inclined face, whereby limited rotation of said cam-plate relatively to said member is permitted upon longitudinal movement of the latter in said frame.

14. In a screw-cutting device, the combination of a frame; a member longitudinally and rotatably movable with respect to said frame; dies movable in said member; a bar longitudinally movable therein and held against longitudinal movement relatively to said frame; a plate rotatably secured to said member and provided with cam-grooves engaging said dies; and a stop secured to said cam-plate so as to be adjustable upon an arc having the axis of the device as its center and adapted to engage said bar, the grooves of said cam-plate being so disposed that the outward pressure of said dies is effective to rotate the same to hold said stop against said bar, and the length of said stop being proportioned to the length of thread to be cut whereby said stop and bar are disengaged upon a predetermined longitudinal movement of said member in said frame.

15. In a screw-cutting device, the combination of a frame; a member longitudinally and rotatably movable in said frame; dies movable in said member; a slide-bar longitudinally movable therein and held against longitudinal movement in said frame; a plate rotatably secured to said member and provided with cam-grooves engaging said dies; and a stop secured to said cam-plate so as to be adjustable upon an arc having the axis of the device as its center and adapted to engage said bar, the grooves of said cam-plate being so disposed that the outward pressure of said dies is effective to rotate the same to hold said stop against said bar, and said stop having a retreating contact-face whereby a limited rotative movement is permitted said cam-plate relatively to said member pending the longitudinal movement of the latter, and the length of said stop being proportioned to the length of thread to be cut, whereby said stop and bar are disengaged upon a predetermined amount of such longitudinal movement.

16. In a screw-cutting device, the combination of a frame comprising alined annular portions; a flanged sleeve rotatably and longitudinally movable in said portions; dies movable in the flange of said sleeve; a cam-plate rotatably secured on the face of said flange and engaging said dies; and engaging elements respectively mounted upon the flange of said sleeve, so as to be rotatable therewith, and upon said cam-plate, the engaging faces of said elements being arranged and constructed to permit, upon relative movement therebetween, a limited rotative movement of said cam-plate, and the first of said elements being held against longitudinal movement with respect to said frame, whereby such relative movement between said elements is had.

17. In a screw-cutting device, the combination of a frame comprising alined annular portions; a flanged sleeve rotatably and longitudinally movable in said portions; dies movable in the flange of said sleeve; a cam-plate rotatably secured on the face of said flange and engaging said dies; and engaging elements respectively mounted upon the flange of said sleeve, so as to be rotatable therewith, and upon said cam-plate, the first of said elements being held against longitudinal movement with respect to said frame and the length of such element being proportioned to that of the thread to be cut, whereby said elements are disengaged upon predetermined longitudinal movement of said sleeve in said frame.

18. In a screw-cutting device, the combination of a frame comprising alined annular portions; a flanged sleeve rotatably and longitudinally movable in said portions; dies movable in the flange of said sleeve; a rider-bar longitudinally movable in the periphery of such flange and held against longitudinal movement with respect to said frame; a cam-plate rotatably secured on the face of said flange and engaging said dies; a dog mounted in the end of said bar and depending in front of said cam-plate; and a stop secured to said cam-plate and adapted to engage said dog, said stop having a retreating contact-face, whereby a limited rotative movement is permitted said cam-plate pending the longitudinal movement of said sleeve.

19. In a screw-cutting device, the combination of a frame comprising alined annular portions; a flanged sleeve rotatably and longitudinally movable in said portions; dies movable in the flange of said sleeve; a rider-bar longitudinally movable in the periphery of such flange and held against longitudinal movement with respect to said frame; a plate rotatably secured on the face of said flange and provided with cam-grooves engaging said dies; a dog mounted in the end of said bar and depending in front of said cam-plate; and a forwardly projecting stop secured to said cam-plate and adapted to engage said dog, the grooves of said cam-plate being so disposed that the outward pressure of said dies is effective to rotate the same to hold said stop against said bar, and said stop having a retreating contact-face, whereby a limited rotative movement is permitted said cam-plate pending the longitudinal movement of said sleeve.

20. In a screw-cutting device, the combination of a frame comprising alined annular portions; a flanged sleeve rotatably and longitudinally movable in said portions; dies movable in the flange of said sleeve; a rider-bar longitudinally movable in the periphery of such flange and held against longitudinal movement with respect to said frame; a plate rotatably secured on the face of said flange, and provided with cam-grooves engaging said dies, a dog mounted in the end of said bar and adapted to depend in front of said cam-plate; and a forwardly projecting stop secured to said cam-plate and adapted to engage said dog pending a predetermined longitudinal movement of said sleeve and thereupon to release the same, the grooves of said cam-plate being so disposed that the outward pressure of said dies is effective to rotate the same to hold said stop against said bar, and said stop having a retreating contact-face, whereby a limited rotative movement is permitted said cam-plate pending the longitudinal movement of said sleeve, said stop also being of a length proportioned to the length of the thread to be cut, whereby said stop is released from said dog upon a predetermined amount of such movement.

21. In a screw-cutting device, the combination of a frame comprising alined annular portions; a flanged sleeve rotatably and longitudinally movable in said portions; dies movable in the flange of said sleeve; a rider-bar longitudinally movable in the periphery of such flange and held against longitudinal movement with respect to said frame; a cam-plate rotatably secured on the face of said flange and engaging said dies; a dog mounted in the end of said bar so as to have a limited rotative movement with respect thereto, said dog being adapted in one position to depend in a radially alined direction in front of said cam-plate; a spring frictionally engaging said dog; and a stop attached to the face of said cam-plate, so as to be adjustable upon an arc having the axis of the device as its center, said stop bearing a forwardly projecting stud having a beveled contact face adapted to engage said dog pending the longitudinal movement of the latter, whereby a limited rotative movement is permitted said cam-plate pending the longitudinal movement of said sleeve.

22. In a screw-cutting device, the combination of a frame comprising alined annular portions; a flanged sleeve rotatably and longitudinally movable in said portions; dies movable in the flange of said sleeve; a rider-bar longitudinally movable in the periphery of such flange and held against longitudinal movement with respect to said frame; a cam-plate rotatably secured on the face of said flange and engaging said dies, the outward pressure of the latter, when the device is in operation, being effective to rotate said cam-plate; a dog mounted in the end of said bar so as to have a limited rotative movement with respect thereto, said dog being adapted in one position to depend in a radially alined direction in front of said cam-plate; a spring frictionally engaging said dog; and a stop attached to the face of said cam-plate, so as to be adjustable in an arc having the axis of the device as its center, said stop bearing a forwardly projecting stud having a beveled contact-face of a length proportioned to the length of the thread to be cut and adapted to engage said dog pending a portion of the longitudinal movement of the latter, whereby a limited rotative movement is permitted said cam-plate pending the longitudinal movement of said sleeve and said cam-plate thereupon left free to rotate.

23. In a screw-cutting device, the combination of a frame comprising alined annular portions; a flanged sleeve rotatably and longitudinally movable in said portions; dies movable in the flange of said sleeve; a rider-bar longitudinally movable in the periphery of such flange and held against longitudinal movement with respect to said frame by engagement therewith, said bar being provided with a notch in its outer end, a cam-plate rotatably secured on the face of said flange and engaging said dies, the outward pressure of the latter when the device is in operation being utilized to rotate said cam-plate; a dog pivoted in the notch in the outer end of said rider-bar and adapted, when depending in a radially alined direction in front of said cam-plate, to be locked by contact with the bar against movement in one direction; a spring frictionally engaging said dog and adapted to retain the same in whatever position it may be placed; and a stop attached to the face of said cam-plate, so as to be adjustable upon an arc having the axis of the device as its center, said stop bearing a forwardly projecting stud of a length proportioned to the length of the thread to be cut and adapted to engage said dog pending a portion of the longitudinal movement of the latter, the contacting faces of said stop and dog being substantially helicoidal in conformation, whereby a limited rotative movement is permitted said cam-plate pending the longitudinal movement of said sleeve, and said cam-plate thereupon left free to rotate.

24. In a screw-cutting device, the combination of work-holding means and a member longitudinally and rotatably movable with respect to each other; dies movable in said member; a plate rotatably secured to said member, said plate engaging said dies and being adapted upon rotation to position the same in said member, the die-engaging means of said plate being so arranged and constructed that the outward pressure of said dies is effective to rotate said plate in a predetermined direction; means adapted to control the rotation thus had, the operation of such means being effective upon the longitudinal movement of said member; and other means adapted to limit such rotation.

25. The combination of work-holding means, a member longitudinally and rotatably movable with reference thereto; dies movable in said member; a plate rotatably secured to said member, said plate engaging said dies and being adapted upon rotation to position the same in said member, the die-engaging elements of said plate being so arranged and constructed that the outward pressure of said dies is effective to rotate said plate in a predetermined direction; an element borne by said member, so as to be rotatable therewith, but longitudinally fixed relatively to said work-holding means, said element engaging with said plate and the length of the engaging faces of said element and plate being proportioned to the length of thread to be cut, whereby said plate is disengaged from said element upon proper longitudinal movement of said member with respect to said work-holding means and thus left free to rotate; and other means adapted thereupon to limit such rotation.

26. In a screw-cutting device, the combination of a frame comprising alined annular portions; a flanged sleeve rotatably and longitudinally movable in said portions; dies movable in the flange of said sleeve; a rider-bar longitudinally movable in the periphery of such flange and held against longitudinal movement with respect to said frame by engagement therewith; a cam-plate rotatably secured on the face of said flange and engaging said dies, the outward pressure of the latter when the device is in operation being effective to rotate said cam-plate; a dog mounted in the end of said bar and adapted to depend in front of said cam-plate; a stop secured to said cam-plate, so as to be adjustable upon an arc having the axis of the device as its center, said stop being adapted to engage said dog and having a forwardly projecting, retreating contact-face of a length proportioned to the length of the thread to be cut, whereby a limited rotative movement is permitted said cam-plate pending the longitudinal movement of said sleeve and said cam-plate thereupon left free to rotate; and a second, radially projecting stop borne by said cam-plate and adapted to engage said bar upon such disengagement of said first stop.

27. In a screw-cutting device, the combination with a work-holding member; of a member independently longitudinally and rotatably movable relatively thereto; chaser dies mounted in said second member, each of said dies being formed with a single cutting face having its main thread cut on one taper and a thread in its throat cut on another and more abrupt taper; and engaging elements borne by said members respectively, said elements being arranged and constructed upon rotation of said second member to produce a limited longitudinal movement thereof, whereby the threads in the throat of said dies are caused to grip the work, substantially as described.

28. In a screw-cutting device, the combination with chaser dies, each formed with a single cutting face having its main threads cut on one taper and threads in its throat cut on another and more abrupt taper; of a member movably supporting said dies in such manner that they may retract during the cutting operation; and means whereby the retraction of the dies is controlled, the length of the more abruptly tapered threads of the dies being so correlated with the rate of retraction that said more abruptly tapered threads, after serving to initially grip the stock, are relieved from forming the threads on the stock and the burden of this operation thrown on the less abruptly tapered threads of the dies.

29. The combination with a die-housing, a work-holder, and a series of chaser-dies movable in said housing; of a plate rotatable with, and also relatively to, said housing, said plate being adapted upon such relative rotation to move said dies in said housing; a second plate; means detachably connecting the two plates; and means coöperative with said second plate, adapted to control rotation thereof and of said first plate relatively to the housing and thereby to control the movement of said dies in said housing.

30. The combination with a die-housing, a work-holder, and a series of chaser-dies movable in said housing; of a plate rotatable with, and also relatively to, said housing, said plate being constructed to interlock with said dies so as to move the same in said housing upon such relative rotation of said plate; a post mounted on said work-holder and rotatable with said housing, the latter being designed to travel, during the cutting operation, on a line parallel with said post; and a second plate having a rotatable adjustment relatively to said die-engaging plate, said second plate engaging with said post, whereby the rotation of said die-engaging plate during the cutting operation is controlled.

31. The combination with a die-housing, a work-holder, and a series of radially-arranged chasers; of a chaser-engaging plate rotatable with, and also relatively to, the housing; a second plate; means detachably connecting the two plates; and means coöperating with said second plate for controlling the rotation thereof and of said first plate relatively to the housing, and, thereby, of the recession of the chasers.

32. The combination with a die-housing, a work-holder, and a series of radially-arranged chasers; of a plate rotatable relatively to the housing, and constructed to interlock with the chasers and control their recession during the cutting operation; a post mounted on said work-holder and rotatable with said housing; and a second plate engaging with said post, whereby the rotation of said chaser-engaging plate during the cutting operation is controlled; said latter plate having a rotatable adjustment relatively to the second mentioned plate, and said housing being designed to travel, during the cutting operation, on a line parallel with said post.

33. In a threading device, a series of radially-arranged pipe-engaging members; an axially rotatable plate having an interlocking engagement with said members for controlling their recession; a second plate; means for detachably connecting the two plates together, the first mentioned plate being movable relatively to the second mentioned plate when disconnected therefrom, and means engaging said second mentioned plate for controlling the rotation of both plates when they are connected.

Signed by me, this 21st day of March, 1906.

LOUIS F. HART.

Attested by—
  JNO. F. OBERLIN,
  D. T. DAVIES.

---

Copies of this patent may be obtained for five cents each, by addressing the "Commissioner of Patents, Washington, D. C."